May 29, 1951 M. WALLACE 2,554,760
NAVIGATIONAL SYSTEM
Filed April 19, 1946 2 Sheets-Sheet 1
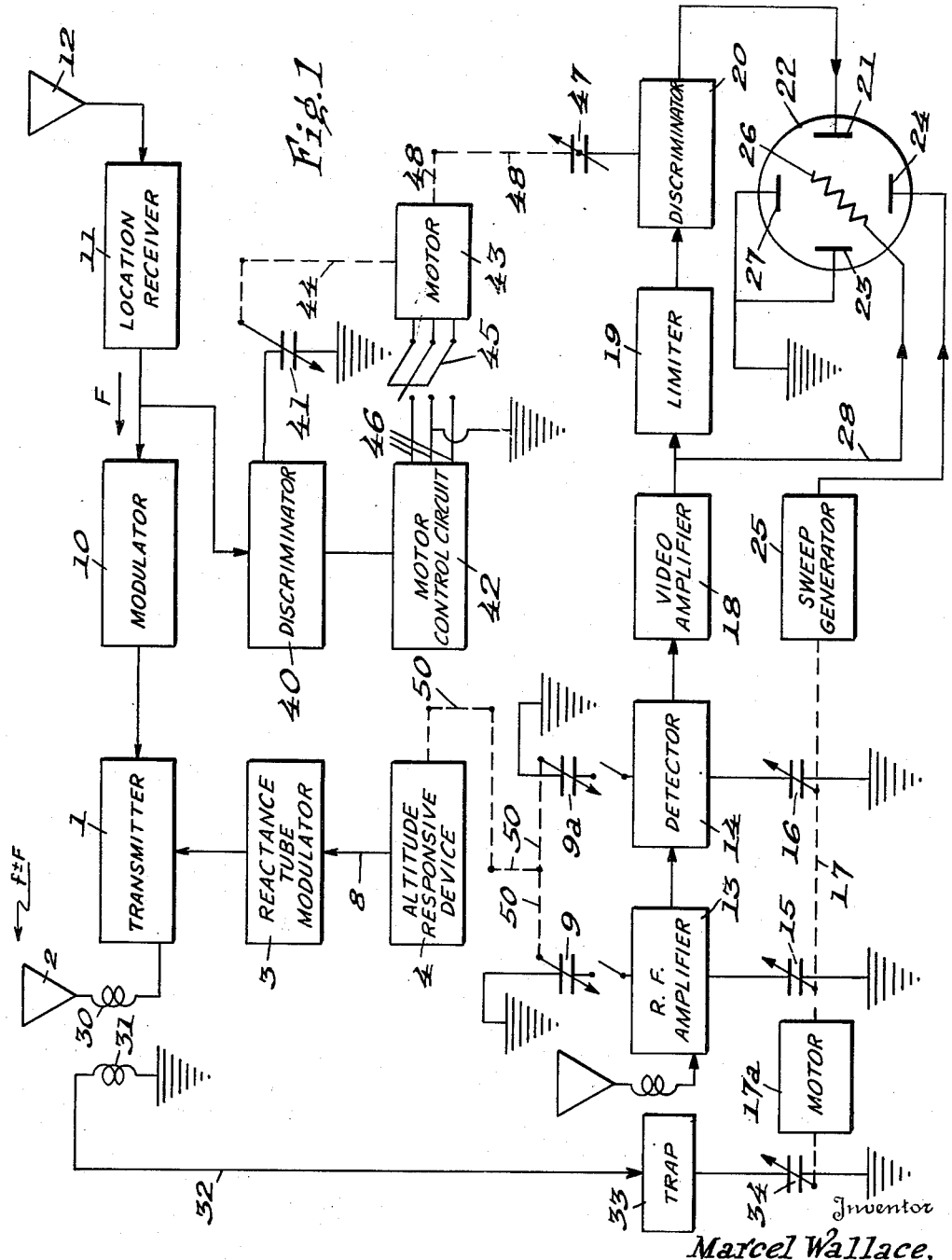
Inventor
Marcel Wallace,
By Hyman Hurwitz
his Attorney

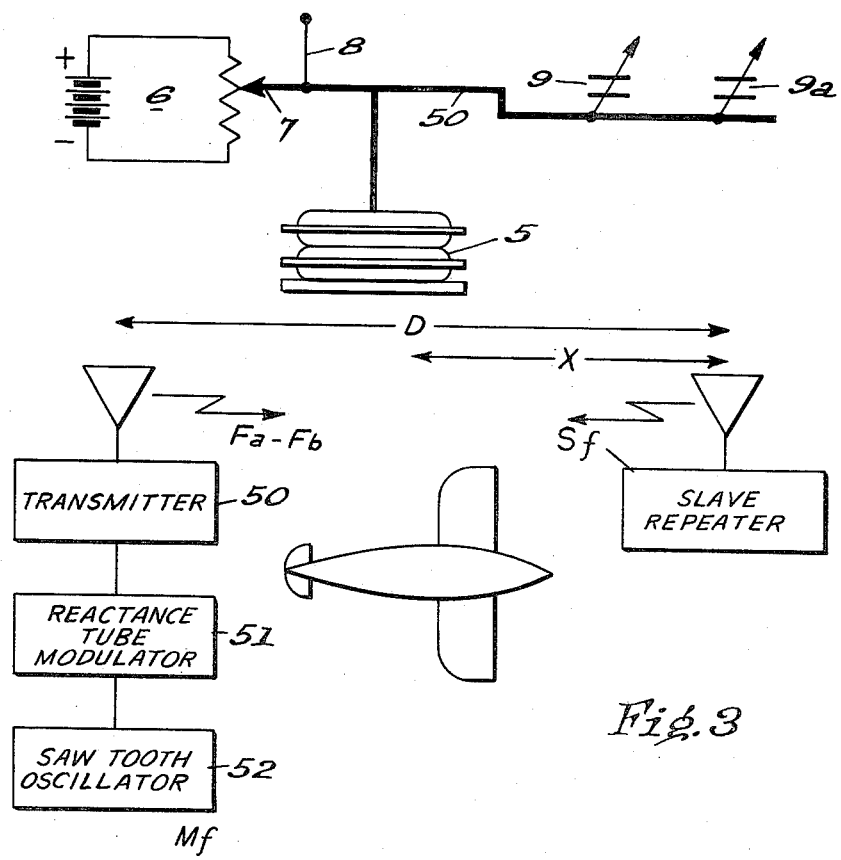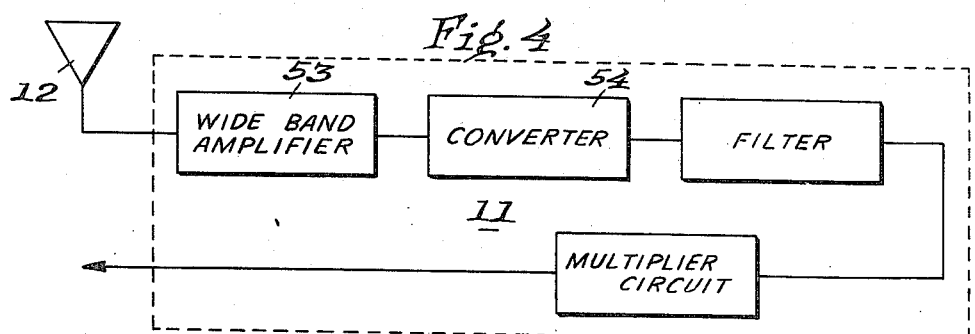

Patented May 29, 1951

2,554,760

UNITED STATES PATENT OFFICE 2,554,760

NAVIGATIONAL SYSTEM

Marcel Wallace, Fairfield County, Conn., assignor, by mesne assignments, of one-half to Panoramic Radio Corporation, New York, N. Y., a corporation of New York Application April 19, 1946, Serial No. 663,311

42 Claims. (Cl. 343—112)

1

This invention relates generally to navigational systems and relates in particular to navigational systems for indicating simultaneously the altitudes and relative distances of a plurality of aircraft.

In accordance with the present invention an airway is defined in terms of one or more pairs of frequency modulated master transmitter stations and slave repeater stations, separated by any predetermined distance in the line of the airway. It will be shown that aircraft located intermediate a master-slave pair, and equipped with suitable receiver-analyzer equipment, may determine its own location with respect to the master-slave pair by combining signals received simultaneously from both stations, the said location being determined in terms of a frequency proportional to the distance of the craft from the slave station.

I propose accordingly to transmit from each of a plurality of aircraft a carrier signal on a frequency determined by the altitude of the aircraft, and to modulate each altitude representative carrier with a modulation signal derived from a master-slave pair and representative of the location of the aircraft on the airway, in terms of its frequency.

The signals transmitted from the various craft may be received at each craft for analysis and indication by a suitable panoramic receiver, to provide continuous simultaneous indications of the geographic locations and the altitudes of all the craft. By means of suitable refinements of the system it is further possible to represent the altitudes and locations of all the craft as relative indications with respect to the altitude and the location of one of the craft.

It is accordingly an object of my invention to provide a navigational system for providing simultaneous indications aboard an aircraft of the relative locations and altitudes of a plurality of aircraft.

It is a further object of the invention to provide transmissions from a plurality of aircraft, representative in terms of the carrier frequency and modulation frequency of each transmission of the altitude and location of the transmitting craft.

It is another object of the invention to provide an indicator system for transmissions of the above character for indicating selectively the absolute or the relative altitudes of each of a plurality of craft and the absolute or the relative locations of each of a plurality of craft.

Another object of the invention resides in the provision of a transmitting device for transmit-

2 ting radio signals representative in carrier frequency of one measurable quantity and in modulation frequency of a further measurable quantity.

This invention also consists in certain other features of construction and in the combination and arrangement of the various elements thereof, to be hereinafter fully described, illustrated in the accompanying drawings and specifically pointed out in the appended claims.

In the drawings:

Figure 1 illustrates schematically and in block diagram a system for transmitting from an aircraft a signal at a frequency corresponding with the altitude of the aircraft, and modulated with signals representative of location, and for receiving similar signals from a plurality of remote aircraft and translating same in terms of visual indications;

Figure 2 is a schematic view of a detail of Figure 1.

Figure 3 illustrates schematically a master transmitter and an associated slave repeater station, the master transmitter being frequency modulated to provide signals of value in connection with my invention; and Figure 4 illustrates in schematic block diagram certain details of a receiver shown schematically in Figure 1 of the drawings.

Referring now specifically to Figure 1 of the drawings, which represents in schematic block diagram an installation aboard an aircraft, the numeral 1 represents a radio transmitter having an antenna 2, and which is associated with means for controlling the frequency of transmission $f$, comprising a reactance tube modulator 3 controllable in the usual manner in response to control voltages applied to certain elements thereof. Control voltages for the modulator 3 are supplied by an altitude responsive device 4, illustrated schematically in Figure 2 of the drawings and which may comprise an aneroid cell 5 for providing a mechanical motion proportional to the altitude or atmospheric pressure to which the cell may be submitted. The mechanical motion of the aneroid cell may be translated in terms of voltage by means of a potentiometer 6, the movable arm 7 of which may be suitably mechanically coupled to the aneroid cell, and electrically connected by lead 8 to the reactance tube modulator 3.

The aneroid cell 5 may likewise be mechanically coupled to a variable condenser 9 for varying the tuning thereof in proportion to the movement of the cell, the function of the condenser 9 being hereinafter fully described.

The frequency controllable transmitter 1 may be modulated in amplitude by means of a modulator 10 supplied with alternating signals having a frequency F, representative in value of the location of an aircraft on a predetermined airway. While signals representative of the geographical location of an aircraft may be derived in any of several different ways, I prefer in connection with the apparatus illustrated in Figure 1 of the drawings, to derive such signals from a master transmitter and slave repeater located along an airway and each transmitting frequency modulated signals which may be simultaneously received and translated in a properly designed receiver, at the output of which will be provided signals at the frequency F. Such a receiver I have represented by the numeral 11, its associated receiving antenna being denominated 12. The master-slave stations referred to above are illustrated schematically in Figure 3 of the drawings, a detailed description of the operation of the system being provided hereinafter in connection with the explanation of that figure.

It will now be apparent that a plurality of aircraft, flying on a given airway, each equipped with a location receiver such as 11 and with suitable transmitting equipment responsive to the output of the receiver 11 and to the altitude of each craft, and such as is illustrated in Figure 1 of the drawings, may each transmit carrier signals of frequency $f$ representative of altitude and modulated with a signal the frequency F of which is in turn representative of geographical location. The various carriers may all be arranged to fall within a predetermined relatively limited frequency range $f_1$ to $f_2$ and the modulation frequencies may be arranged to fall within a relatively narrow frequency range $F_1$ to $F_2$.

In accordance with my invention, signals transmitted from the various aircraft may be received aboard each of the aircraft, and there translated into simultaneous visual indications of the altitudes and locations of the various craft, by means of receiver-indicator apparatus comprising a tunable R. F. amplifier 13, and a detector 14 for detecting signals provided by the R. F. amplifier 13. The amplifier 13 and the detector 14 are tunable in synchronism and cyclically, at any convenient rate, and which may be 30 or 60 cycles per second if desired, by means of a pair of rotatable tuning condensers 15 and 16 mounted for actuation by a common device such as a shaft represented schematically by means of the dotted line 17, and which may be driven by a motor 17a. By tuning the R. F. amplifier 13 and its associated detector 14 through the frequency range $f_1$ to $f_2$ inclusive, by means of the associated rotating condensers 15 and 16, the various altitude representative carrier frequencies originating aboard the various aircraft on the airway are received successively, detected and the detected modulation signals F, falling in the frequency range $F_1$ to $F_2$ are applied to the video amplifier 18, suitably amplified therein, limited in amplitude by means of the limiter 19 and thereafter applied to the discriminator circuit 20, for translation of each frequency F into a corresponding voltage.

In one mode of operation of my novel apparatus the discriminator 20 may be tuned to a frequency midway of the range $F_1$ to $F_2$, whereby a maximum voltage of one polarity may be derived from the discriminator in response to a frequency $F_1$ and a maximum voltage of opposite polarity in response to the frequency $F_2$, signals at the said mid-frequency producing zero voltage output.

The output voltages of the discriminator 20 may be applied to a horizontal plate 21 of a cathode ray indicator 22, the opposing horizontal plate 23 being grounded, whereby the cathode ray of the indicator may be caused to deflect an amount horizontally which is a linear function of any frequency F applied to the discriminator 20.

One vertical plate 24 of the cathode ray indicator 22 is supplied with sweep voltage by means of a mechanical sweep generator 25, which may be driven from the shaft 17, as is schematically indicated in the drawings, and which supplies a linear sweep voltage to the plate 24 in synchronism with the tuning of the condensers 15 and 16. The sweep voltage applied to the plate 24 varies between a predetermined negative and an equal positive value, the middle or zero value of the sweep voltage being aligned, in one mode of operation of my apparatus, with values of capacitance of condensers 15 and 16 corresponding with a frequency midway of the carrier frequency range $f_1$ to $f_2$. The plate 27 being grounded, the cathode ray of the indicator 22 will be caused to scan periodically in a vertical direction, the value of the deflection at any instant bearing a correspondence with a frequency of the range of frequencies $f_1$ to $f_2$.

The cathode ray beam of the indicator 22 is normally de-intensified by means of intensity control grid 26 of said indicator, so that in the absence of signals substantially no visible indications are provided. The intensity control grid 26 is coupled by means of a lead 28 to the output of the video amplifier 18, which provides the grid 26 with intensifying signals only in response to the presence of signals in the amplifier 18.

Upon reception of a carrier frequency $f$, modulated with a signal at frequency F, the vertical position of the cathode ray beam of the indicator 22 corresponds with the value of the frequency $f$, by reason of the correspondence between the voltage supplied by the sweep generator 25 and the tuning of amplifier 13 and detector 14. A potential is supplied by the discriminator 20 to the horizontal plate 21 of the indicator 22, the magnitude of which depends upon the value of the frequency F, whereby a horizontal deflection of the cathode ray beam is produced which is representative of the frequency F. At the same time the grid 26 is supplied with intensifying voltage by the video amplifier 18 and causes registration of a visible dot indication on the face of the indicator 22. It will be readily seen that the position of the visible dot will correspond vertically to an altitude and horizontally to a distance along an airway, of a transmitting craft, and that a very considerable number of such indications may be successively produced, in response to signals originating on a plurality of aircraft, and that due to the phenomenon known as "persistence of vision," as well as due to the persistence of the screen of the cathode ray indicator itself, the various indications will be simultaneously visible.

In order to avoid blocking of the local amplifier 13, or of succeeding elements of its associated receiver, I have found it to be desirable to reduce substantially the amplitude of signals derived from local transmitter 1 during the short interval in which amplifier 13 is tuned to the same frequency as the transmitter 1. For this purpose I couple to a coil 30 in the circuit of the antenna 2 which is associated with the transmitter 1, a further coil 31, which is connected by means of a lead 32 with a tunable trap circuit 33, the tuning element 34 of which is represented as a condenser, and which is varied in synchronism with condensers 15 and 16 by means of the shaft 17, and the motor 17a. By maintaining the tuning of the trap 33 at all times at the frequency of the amplifier 13, flow of energy from the transmitter 1 to the amplifier 13 is substantially reduced, the trap serving as an absorption means for that energy. The function of the transmitter 1 of transmitting information bearing signals to equipments located on other than the local aircraft is not materially interfered with, however, since absorption of energy from the transmitter 1 takes place during only a small fraction of the total transmitting time.

My system, insofar as I have described it heretofore, provides for the transmission from each of a plurality of craft of radio signals representative of altitude and geographic location on an airway, and for reception aboard each of the plurality of craft of the radio signals originating at the various craft, and the translation of said signals into visual indications of the absolute altitudes and locations of the various craft. It is, however, often desirable to provide indications aboard each craft of the relative rather than the absolute altitudes and locations of the various craft, that is, whether each of the various craft is above or below, forward or abeam, of its own position. I have accordingly provided means which may be selectively utilized as desired, for maintaining the indication corresponding to the altitude and geographic location of each craft at the center of the viewing screen of the indicator aboard that craft, the indications corresponding to all other craft being located above or below, to the left or to the right of center, in accordance with relative altitudes or locations of the other craft with respect to the craft bearing the indicator.

To accomplish the above purpose, I supply the frequency F which is utilized as a modulating signal to a tunable discriminator 40, comprising a suitable tuning condenser 41. Output voltages from the discriminator 40 are applied to motor control circuit 42 which controls the motor 43 in accordance with the character of the voltages supplied thereto by the discriminator circuit. The motor 43 in turn serves to control the adjustment of the tuning condenser 41 by means of a drive shaft, represented conventionally by dotted lines 44.

In one usual form of the discriminator voltages are produced in the output thereof which are of one polarity or another depending upon whether the frequency of the input signal F is above or below the frequency to which the discriminator is tuned. The motor control circuit 42, on the other hand may comprise a means such as a polarized relay (not shown), responsive to the output of the discriminator 40 for applying suitable potentials via lines 46 and switch 45 to the motor 43 to control the direction of rotation thereof, which is arranged to be such as to vary the capacitance of the condenser 41 to a value such as to tune the discriminator 40 to the frequency F. Upon accomplishment of the tuning operation the output voltage of the discriminator becomes zero and the motor 43 becomes quiescent. Since many devices and circuits are known for automatically tuning a tunable device to the frequency of an input signal, further detailed illustration and description of a device of this character suitable for application to my novel apparatus may be dispensed with.

The motor 43 serves not only to vary the tuning of the condenser 41 but also similarly to position a condenser 47, by means of suitable mechanical coupling indicated conventionally as dotted lines 48, this condenser serving to tune the discriminator 20 so that its central frequency corresponds with the frequency F being supplied for transmission to the modulator 10. It will be clear that the horizontal beam deflection at indicator 22 corresponding to the modulation signal F of its own local transmitter will at all times be located centrally of the viewing screen of the indicator, and that all other modulation signals corresponding to those originating at the various aircraft, and representative of the locations thereof, will appear to the right or to the left of the locally produced indication, depending upon the relative locations of the various aircraft along the airway with respect to that of the local craft.

In order to provide for relative rather than absolute indications of altitude aboard the various craft it is required that the center frequency of the R. F. amplifier 13 and the detector 14 be maintained in correspondence with the frequency of the transmitter 1, since in such event the vertical indication of the cathode ray indicator 22 corresponding to the frequency f of the transmitter 1 will appear always centrally of the viewing screen of the indicator. I may accomplish this object in a variety of ways but for the sake of simplicity I may control an auxiliary condenser 9 for the tuned circuit of the amplifier 13, and a similar auxiliary condenser for the tuned circuit of the detector 14 by means of a mechanical linkage 50 deriving its actuating force from the aneroid cell 5, as indicated in Figure 2 of the drawings. As the aneroid cell varies due to changes of altitude, to vary the control voltage applied to the lead 8, so likewise the tuning of the amplifier 13 and the detector 14 are varied, to maintain a correspondence between the frequency of the transmitter 1 and the central frequency of the amplifier-detector.

Referring now to Figure 3 of the drawings for illustrative matter in connection with the following description of one mode of deriving modulating signals representative of location, for application to modulator 10 (Figure 1) there is illustrated a master transmitter Mr, and a slave repeater indicated generally as Sr, and comprising a slave oscillator constrained to operate at the frequency of signals received thereby. Such slave repeater systems are well known in the art, and selection of a suitable system for inclusion in any actual installation may be left to the skill of the engineer. I refer to repeaters of the character of those disclosed in Patent #2,183,562, issued December 19, 1939, to Hansell as exemplary of repeater stations available for use in the systems of my invention.

The transmitter 50, associated with the station Mr, is modulated in frequency by a reactance tube modulator 51 which is controlled in turn by the output voltage of the saw tooth generator 52. In this manner signals provided by the transmitter Mr are repetitively frequency modulated in linear fashion, over a predetermined range of frequencies. The slave repeater station repeats all signals impinging thereupon, and there is accordingly provided at any reference point intermediate the master transmitter and the slave repeater, a pair of signals each instantaneously varying and differing in frequency by a constant amount depending on the location of the reference point, as will now be demonstrated.

Let us assume that the transmitter station $M_f$ and its associated slave repeater $S_f$ are separated by a distance D, and that a receiver, such as 11 of Figure 1, is located at a distance $x$ from the repeater station $S_f$. Let us further assume that the velocity of modulation is $$\frac{df}{dt}$$

in cycles per microsecond. If $f$ is the instantaneous frequency of the signal derived from the transmitter $M_f$, at that same instant the frequency of the slave station will be $$f + \frac{df}{dt}\frac{D}{c}$$

where $c$ is the velocity of light, and this frequency will differ from the frequency of the master station $M_f$ by a value corresponding to the change in frequency at the station $M_f$ during the time required for electromagnetic energy to travel the distance D.

At a point intermediate stations $M_f$ and $S_f$, and at a distance $x$ from station $S_f$, two frequencies will be available, one proportional to $$f + \frac{df}{dt}\frac{D-x}{c}$$

and the other to $$f + \frac{df}{dt}\frac{D+x}{c}$$

The difference between these frequencies is $$\frac{2df}{dt}\frac{x}{c}$$

a quantity which is independent of the frequency of the stations $M_f$ and $S_f$, and of the distance between them and which depends only on the velocity of modulation $$\frac{df}{dt}$$

and on the location of the receiver in terms of distance $x$ from the slave station $S_f$.

In order to translate the two received signals at the receiver 11 it is required merely to amplify the said signals simultaneously in a wide band amplifier 53, and to convert the signals appearing at the output of the amplifier 53 by means of converter 54 to a single frequency equal to the difference between the received signals. While the signals themselves are frequency modulated, the difference frequency has a constant value for any given distance, and may be readily filtered from the products of the mixing operation by means of a suitable filter 55, the output of the filter being then representative, in terms of its frequency, of the distance $x$. This frequency may be applied directly to the input of the modulator 10 (Figure 1) or, if desired, may be heterodyned or multiplied by known means to some more convenient value of frequency.

What I claim and desire to secure by Letters Patent of the United States is:

1. In combination, a transmitter, means for measuring altitude, means for controlling the frequency of said transmitter responsive to said means for measuring altitude, means for determining a parameter of geographical location, and means responsive to said means for determining a parameter of geographical location for amplitude modulating said transmitter with signals having frequencies representative of said parameter of geographical location.

2. In combination, first means for transmitting signals at a frequency representative of altitude, second means for providing a further signal at a frequency representative of a parameter of geographical location, and means responsive to said second means for modulating said first means.

3. A navigational system for a plurality of craft comprising transmitting means aboard each of the craft for transmitting a first signal at a frequency representative of altitude, means aboard each of the craft for providing a second signal having a frequency representative of a parameter of geographical location of said craft, means responsive to said second means for modulating said first signal, means aboard each of the craft for receiving said modulated first signals and for translating said modulated first signals into simultaneous indications of the altitudes and of the parameters of geographical locations of said plurality of craft.

4. The combination in accordance with claim 3 wherein said indications represent absolute altitudes and parameters of geographical locations.

5. The combination in accordance with claim 3 wherein said indications are representative of absolute parameters of geographical locations and relative altitudes.

6. The combination in accordance with claim 3 wherein said indications are representative of relative parameters of altitudes and relative geographical locations.

7. The combination in accordance with claim 3 wherein said indications are selectively representative of relative and absolute values.

8. A navigational system comprising means aboard each of a plurality of aircraft for transmitting a carrier signal the frequency of which is representative of the altitude of the aircraft, and for modulating said carrier with modulating signal representative in frequency of a parameter of the location of the aircraft along a predetermined airway, a receiver for receiving said carrier signals, a cathode ray indicator, and means responsive to the output of said receiver for controlling said cathode ray indicator.

9. A navigational system comprising means located at each of a plurality of locations for transmitting carrier signals at frequencies representative of the altitudes of said locations, said frequencies falling within a predetermined band of frequencies, means for modulating said signals at each of said locations with modulating signals at frequencies representative of a parameter of the geographical positions of said locations, said modulating signals falling within a predetermined band of frequencies, receiver means at each of said locations comprising means for scanning the band of frequencies comprising said carrier signals, a cathode ray indicator having at least one deflecting means and a cathode ray beam, means for applying sweep voltage to said at least one deflecting means for sweeping said cathode ray beam synchronously with the scanning of said scanning means, means for normally de-intensifying the cathode ray of said indicator, and means responsive to receipt of signals for applying intensifying voltage to said means for de-intensifying and for simultaneously producing a modulation signal representative deflection of said cathode ray beam.

10. In combination, a source of first signals adjustable in frequency within a first predetermined band, means for modulating said first signals with second signals adjustable in frequency within a second predetermined band, an indicator for said signals arranged for producing an indication of said signals representative in one coordinate of a coordinate system of the frequency of said first signals, and for producing an indication representative of the frequency of said second signals in another coordinate of said coordinate system, and means operative for maintaining at least one of said indications at the origin of said coordinate system.

11. A combination in accordance with claim 10 wherein said last named means is operative to maintain both of said indications at said origin of said coordinate system.

12. In combination, a plurality of sources of signals each adjustable in frequency within a first predetermined band, means for modulating each of said signals with further signals adjustable in frequency within a second predetermined band, means for receiving said signals from said plurality of sources, means for demodulating signals received by said means for receiving, means for indicating simultaneously in respect to a predetermined coordinate system the values of the frequencies of said first signals and of said further signals, each first signal and its associated further signal being represented as a unitary indication, and means for maintaining a predetermined one of said signals on a base line of said system of coordinates.

13. A combination in accordance with claim 12 wherein means are further provided for maintaining a further one of said signals on a further base line of said system of coordinates.

14. In combination, means for generating a first signal at a first frequency within a first frequency band, means for generating a second signal at a second frequency within a second frequency band, means responsive to said signals for indicating the simultaneous values of said frequencies as a unitary indication, and means responsive to said signals for maintaining said indication at a desired pair of values during variation of at least one of said frequencies.

15. In combination, means for generating a plurality of first signals at frequencies variable within a first band of frequencies, means for generating a plurality of further signals at frequencies variable within a further band of frequencies, means responsive to said first and further signals for providing a plurality of unitary indications each representative of a frequency of said first signals and a frequency of said further signals, and means responsive to said first and further signals for maintaining a preselected indication at a predetermined value during variation of at least one of the frequencies giving rise to said indications.

16. In a position reporting system wherein a plurality of stations movable in respect to ranges and altitudes along a predetermined course between two predetermined geographic locations report said ranges and altitudes to a further station, means aboard each of said movable stations for deriving a measurement of its range with respect to one of said predetermined geographic locations, means aboard each of said movable stations for deriving a measurement of its altitude, means for translating said measurements of range and altitude aboard each of said craft into a transmittable signal having characteristics representative of said range and altitude, means for transmitting said transmittable signal from each of said plurality of movable stations to said further station, and means at said further station for receiving and translating said transmitted signals into indications of the ranges and altitudes of said plurality of movable stations.

17. In a position reporting system, wherein a plurality of stations movable along a predetermined course between predetermined geographic locations report their ranges from one of said locations to a further station, means aboard each of said movable stations for deriving a measurement of its range from said one of said locations, means aboard each of said movable stations for translating said measurement into a transmittable signal having a characteristic representative of said range, means aboard each of said stations for transmitting said signal, means at said further station for receiving said signals and for translating said signals as derived from all of said movable stations into a unitary display indication simultaneously of the ranges of said movable stations from said one of said locations.

18. In combination, a carrier transmitter, means for measuring altitude, means for controlling a transmission characteristic of said carrier responsive to said means for measuring altitude, means for determining a parameter of geographical location, and means responsive to said means for determining said parameter of geographical location for modulating said carrier with signals having an information bearing characteristic representative of said geographical location.

19. In combination, first means for transmitting signals having an information bearing transmission characteristic representative of altitude, second means for providing a further signal having an information bearing characteristic representative of a parameter of geographical location, and means responsive to said second means for modulating said first means.

20. A navigational system comprising means aboard each of a plurality of aircraft traveling along an airway for transmitting a signal having an information bearing characteristic which is representative of the altitude of the aircraft and for modulating said signal with modulating signals representative in terms of an information bearing characteristic of the location of the aircraft along said predetermined airway, a receiver for receiving said signals, a cathode ray indicator, and means responsive to the output of said receiver for controlling said cathode ray indicator.

21. In combination, a transmitter, means for measuring a first measurable quantity, means for controlling the frequency of said transmitter responsive to said means for measuring a first measurable quantity, means for determining a parameter of geographic location of said transmitter, and means responsive to said means for determining a parameter geographic location for modulating said transmitter with signals having frequencies representative of said geographic location.

22. In combination, first means for transmitting signals at a frequency representative of a first measurable quantity, second means for providing a further signal having an information bearing characteristic representative of a parameter of geographic location, and means responsive to said second means for modulating said first means.

23. A navigational system comprising means aboard each of a plurality of movable objects for transmitting a carrier signal the frequency of which is representative of a navigational quantity pertaining to said movable object, and for modulating said carrier with modulating signal representative of a further navigational quantity pertaining to said object, a receiver for receiving a plurality of said carrier signals, a cathode ray indicator, and means responsive to the output of said receiver for controlling said cathode ray indicator to indicate simultaneously the values of said navigational quantities pertaining to a plurality of said objects.

24. In combination, a transmitter on a movable object, means for measuring altitude of said transmitter, means for controlling the frequency of said transmitter in response to said means for measuring altitude, means for generating signals representative at each of a plurality of predetermined locations of a geographic parameter of said location, means for receiving said signals on said movable objects and for deriving therefrom a further signal representative of said geographic parameter at said movable object, and means for modulating said transmitter with said further signal.

25. In combination, a carrier transmitter, means on a first movable object for measuring altitude, means for controlling the frequency of said carrier in response to said means for measuring altitude, a predetermined carrier frequency corresponding to each altitude, means on said first movable object for determining a parameter of geographical location, means for modulating said transmitter with signals representative of said parameter of geographical location, a second movable object, means aboard said second movable object for measuring its altitude, a receiver on said second movable object, means for tuning said receiver to receive a carrier having a frequency corresponding with the altitude of said second movable object, said receiver comprising means for scanning a frequency spectrum centered on said frequency corresponding with the altitude of said second movable object.

26. A navigational system for a plurality of craft comprising means aboard each of said craft for transmitting a first signal at a frequency representative of altitude, means aboard each of the craft for providing a second signal representative of a parameter of the geographical location of said craft, means responsive to said second means for modulating said first signal with said second signal, means aboard each of the craft for receiving said modulated first signals and for translating said modulated first signals into simultaneous indications of the altitudes and parameters of geographical locations of said plurality of craft, said means aboard each of said craft for receiving comprising a frequency scanning receiver for periodically scanning a band of frequencies including at least said first mentioned frequency.

27. A navigational system for a plurality of craft comprising transmitting means aboard each of the craft for transmitting a first signal at a frequency representative of altitude, means aboard each of the craft for providing a second signal representative of a parameter of the geographical location of said craft, means responsive to said second means for modulating said first signal with said second signal, means aboard each of the craft for receiving said modulated first signals and for translating said modulated first signals into simultaneous indications of the altitudes and parameters of geographical locations of said plurality of craft, said means aboard each of said craft for receiving comprising a frequency scanning receiver, said frequency scanning receiver having means for establishing and maintaining a reference frequency at a value corresponding with altitudes.

28. A navigational system for a plurality of craft comprising transmitting means aboard each of the craft for transmitting a first signal at a frequency representative of altitude, means aboard each of the craft for providing a second signal having a frequency representative of a parameter of the geographical location of said craft, means responsive to said second means for modulating said first signal, means aboard each of the craft for receiving said modulated first signals and for translating said modulated first signals into simultaneous indications of the altitudes and parameters of geographical locations of said plurality of craft, said means aboard each of said craft for receiving comprising a frequency discriminating circuit for measuring the frequency of said second signals.

29. A navigational system for a plurality of craft comprising transmitting means aboard each of the craft for transmitting a first signal at a frequency representative of altitude, means aboard each of the craft for providing a second signal representative of a parameter of the geographical location of said craft, means responsive to said second means for modulating said first signal with said second signal, means aboard each of the craft for receiving said modulated first signals and for translating said modulated first signals into simultaneous indications of the altitudes and parameters of geographical locations of said plurality of craft, said means aboard each of said craft for receiving comprising a periodically frequency scanning receiver for scanning a spectrum of frequencies representative of a range of altitudes, said frequency scanning receiver comprising means for tuning said frequency scanning receiver to a central frequency representative of altitude of said craft.

30. A navigational system for a plurality of craft comprising transmitting means aboard each of the craft for transmitting a first signal at a frequency representative of altitude, means aboard each of the craft for providing a second signal having a frequency representative of a parameter of the geographical location of said craft, means responsive to said second means for modulating said first signal with said second signal, means aboard each of the craft for receiving said modulated first signals and for translating said modulated first signals into simultaneous indications of the altitudes and parameter of geographical locations of said plurality of craft, said means for receiving aboard each of said craft comprising a frequency discriminator circuit for measuring the frequency of said second signals and means for tuning said frequency discriminator in accordance with the parameter of geographical location of said craft.

31. A navigational system for a plurality of craft comprising transmitting means aboard each of the craft for transmitting a first signal at a frequency representative of altitude, means aboard each of the craft for providing a second signal having a frequency representative of a parameter of the geographical location of said craft, means responsive to said second means for modulating said first signal with said second signal, means aboard each of the craft for receiving said modulated first signals and for translating said modulated first signals into simultaneous indications of the altitudes and parameters of geographical locations of said plurality of craft, said means aboard each of said craft for receiving comprising a frequency scanning receiver for scanning a band of frequencies representative of altitude, and a frequency discriminator circuit for accepting and measuring the frequencies of a band of modulation signals having frequencies representative of geographical locations.

32. A navigational system for a plurality of craft flying a predetermined course comprising transmitting means aboard each of the craft for transmitting a first signal at a frequency representative of altitude, means aboard each of the craft for providing a second signal having a frequency representative of the geographical location along said course of said craft, means responsive to said second means for modulating said first signal with said second signal, means aboard each of the craft for receiving said modulated first signals and for translating said modulated first signals into simultaneous indications of the altitudes and geographical locations along said course of said plurality of craft, said means aboard each of said craft for receiving comprising a frequency scanning receiver for scanning a band of frequencies representative of altitude and a frequency discriminator circuit for accepting and measuring the frequencies of a band of signals including modulations of said first signals and representative of geographical locations along said course, means for tuning said frequency scanning receiver and said discriminator circuit aboard each of said craft in accordance with the altitude and geographical location thereof along said course.

33. A navigational system for a plurality of craft flying a predetermined course comprising transmitting means aboard each of the craft for transmitting a first signal at a frequency representative of altitude, means aboard each of the craft for providing a second signal having a frequency representative of the geographical location along said course of said craft, means responsive to said second means for modulating said first signal, means aboard each of the craft for receiving said modulated first signals and for translating said modulated first signals into simultaneous indications of the altitudes and geographical locations along said course of said plurality of craft, said means aboard each of said craft for receiving comprising a frequency scanning receiver for scanning a band of frequencies representative of altitude and a frequency discriminator circuit for accepting and measuring the frequency of a band of modulation signals having frequencies representative of geographical locations along said course, and a cathode ray tube indicator having means for generating a cathode ray beam and first and second deflection means for deflecting said beam, means for applying beam deflecting signals to said first deflection means for deflecting said beam in synchronism with said scanning, and means for deriving detected output signals from said frequency discriminator circuit and for applying said detected output signals to said second deflection means.

34. A navigational system for a plurality of craft flying a predetermined course comprising transmitting means aboard each of the craft for transmitting a first signal at a frequency representative of altitude, means aboard each of the craft for providing a second signal having a frequency representative of the geographical location along said course of said craft, means responsive to said second means for modulating said first signal with said second signal, means aboard each of the craft for receiving said modulated first signals and for translating said modulated first signals into simultaneous indications of the altitudes and geographical locations along said course of said plurality of craft, said means aboard each of said craft for receiving and translating comprising a frequency scanning receiver for scanning a band of frequencies representative of altitude and a frequency discriminator circuit for accepting and measuring the frequencies of a band of signals including modulations of said first signals representative of geographical locations along said course, and means for tuning said frequency scanning receiver and said discriminator aboard each of said craft in accordance with the altitude and geographical location thereof along said course, said means aboard each of said craft for translating said modulated first signals into simultaneous indication of the altitude and geographical locations along said course of said plurality of craft comprising a cathode ray tube indicator having means for generating a cathode ray beam and first and second deflection means for deflecting said beam, means for applying deflecting signals to said first deflecting means for deflecting said beam in synchronism with said scanning, and means for deriving detected output signals from said frequency discriminator circuit and for applying said detected output signals to said second deflection means.

35. In combination, a source of first signal adjustable in frequency within a first predetermined band, means for modulating said first signal with second signal adjustable in frequency within a second predetermined band, an indicator for said signals arranged to produce an indication of said signals representative in one coordinate of a coordinate system of the frequency of said first signal, and for producing an indication representative of the frequency of said second signal in another coordinate of said coordinate system.

36. In combination, a source of first signals adjustable in frequency within a predetermined band of frequencies, first means for measuring altitude, means responsive to said first means for measuring altitude for determining the frequency of said first signals, means for modulating said signals with modulation representative of information, a remote receiver for receiving said signals, means for tuning said remote receiver within said predetermined band of frequencies, second means for measuring altitude, means responsive to said second means for measuring altitude for actuating said means for tuning for establishing a tuning of said remote receiver, said remote receiver comprising means for detecting said modulation to derive a further signal representative of said information, and means responsive to said further signal for visually displaying said information and the frequency of said first signals.

37. In combination, a first frequency modulated transmitter located at a first point along an airway, a slave repeater for repeating transmissions from said first transmitter, means for receiving signals from said first transmitter and from said repeater simultaneously, means responsive to said means for receiving comprising means for combining said signals from said first transmitter and from said repeater for generating a further signal having a frequency representative of a parameter of location along said airway, a transmitter tuned in accordance with its altitude for transmitting an altitude representative carrier, and means for modulating said carrier with said further signal.

38. A telemetric system comprising a plurality of separate means each for transmitting a carrier signal at a frequency representative of first information, each of said separate means comprising means for modulating the carrier transmitted thereby with a modulation signal representative of further information, a receiver for receiving said carriers, a cathode ray indicator, and means responsive to the signal output of said receiver for controlling said cathode ray indicator to indicate substantially simultaneously said first and further information contained in said plurality of carriers and in said modulation signals.

39. A telemetric system comprising a plurality of separate means each for transmitting a carrier signal at a frequency representative of first information, each of said separate means comprising means for modulating the carrier transmitted thereby with a modulation signal representative of further information, a receiver for receiving said carriers and for providing signal output responsive thereto, a visual display indicator, and means responsive to said signal output of said receiver for controlling said visual display indicator to indicate substantially simultaneously said first and further information contained in said plurality of carriers and in said modulation signals.

40. A telemetric system comprising a plurality of separate means each for transmitting a signal having an information bearing characteristic representative of first information, each of said separate means comprising further means for modifying said first mentioned signal in accordance with further information, a receiver for receiving said signals and for providing signal output responsive thereto, a cathode ray indicator, means responsive to said signal output of said receiver for controlling said cathode ray indicator to indicate substantially simultaneously said first and further information contained in said signal output.

41. A telemetric system comprising a plurality of separate means each for transmitting a signal having an information bearing characteristic representative of first information, each of said separate means comprising further means for modulating said first mentioned signal in accordance with further information, a receiver for receiving said signals, a visual display indicator, and means responsive to the signal output of said receiver for controlling said visual display indicator to indicate substantially simultaneously all said first and further information contained in a plurality of said signals deriving from said plurality of separate means.

42. A telemetric system comprising a plurality of separate means each for transmitting a signal having an information bearing characteristic representative of first information, each of said separate means comprising further means for modifying said first mentioned signal in accordance with further information, a receiver for receiving said signals and for providing signal output responsive thereto, a visual display indicator for providing a plurality of coordinate indications each in terms of position of a single visible indication having positional coordnates representative of said first and further information, respectively, and means responsive to said signal output for actuating said visual display indicator to indicate substantially simultaneously said first and further information contained in a plurality of said signals deriving from said plurality of separate means.

MARCEL WALLACE.

REFERENCES CITED

The following references are of record in the file of this patent:

UNITED STATES PATENTS

| Number | Name | Date |
| --- | --- | --- |
| 2,279,246 | Podliasky et al. | Apr. 7, 1942 |
| 2,296,041 | Luck | Sept. 15, 1942 |
| 2,367,907 | Wallace | Jan. 23, 1945 |
| 2,378,298 | Hilferty | June 12, 1945 |
| 2,378,604 | Wallace | June 19, 1945 |
| 2,403,603 | Korn | July 9, 1946 |
| 2,405,231 | Newhouse | Aug. 6, 1946 |